United States Patent [19]

Basista et al.

[11] Patent Number: 4,953,929
[45] Date of Patent: Sep. 4, 1990

[54] FIBER OPTIC CONNECTOR ASSEMBLY AND ADAPTER FOR USE THEREWITH

[75] Inventors: Joseph F. Basista, Owego; Wai M. Ma; John J. Squires, both of Endicott, all of N.Y.

[73] Assignee: International Business Machines, Armonk, N.Y.

[21] Appl. No.: 382,925

[22] Filed: Jul. 21, 1989

[51] Int. Cl.$^5$ .............................................. G02B 6/38
[52] U.S. Cl. ................................. 350/96.2; 350/96.21
[58] Field of Search .................. 350/96.2, 96.21, 96.22

[56] References Cited

U.S. PATENT DOCUMENTS

| | | | |
|---|---|---|---|
| 3,136,515 | 6/1962 | Potruch . | |
| 3,485,467 | 4/1967 | Fuchs | 248/68 |
| 3,486,531 | 12/1969 | Nalodka | 138/103 |
| 4,073,050 | 2/1978 | Kloots | 350/96.2 |
| 4,312,564 | 1/1982 | Cefarelli | 350/96.22 |
| 4,405,201 | 9/1983 | Cefarelli | 350/96 |
| 4,534,617 | 8/1985 | Kloots et al. | 350/96.2 |
| 4,553,813 | 11/1985 | McNaughton | 250/227 |
| 4,553,814 | 11/1985 | Bahl | 350/96.23 |
| 4,568,143 | 2/1986 | Yamada et al. | 350/96.2 |
| 4,595,839 | 6/1986 | Braun et al. | 350/96.2 |
| 4,645,295 | 2/1987 | Pronovost | 350/96.21 X |
| 4,653,848 | 3/1987 | Kloots | 350/96.22 |
| 4,744,629 | 5/1988 | Bertolio et al. | 350/96.2 |
| 4,762,388 | 8/1988 | Tanaka | 350/96.23 |
| 4,826,277 | 5/1989 | Weber | 350/96.23 |

FOREIGN PATENT DOCUMENTS

| | | | |
|---|---|---|---|
| 55-67713 | 5/1980 | Japan | 350/96.21 |
| 63-237006 | 10/1988 | Japan | 350/96.21 |
| GB893448 | 11/1959 | United Kingdom | 89/99 |
| GB1209021 | 8/1966 | United Kingdom | F1613/02 |

OTHER PUBLICATIONS

IBM TDB-vol. 14, No. 3 (8/81), p. 725.
IBM TDB-vol. 21, No. 5 (10/78), pp. 2115, 2116.
IBM TDB-vol. 22, No. 9 (2/80), pp. 3975, 3976.
IBM TDB vol. 24, No. 2 (7/81), pp. 1154, 1155.
IBM TDB-vol. 24, No. 3 (8/81), pp. 1622, 1623.
IBM TDB-vol. 22, No. 10 (3/80), p. 4475.

Primary Examiner—John D. Lee
Assistant Examiner—John Ngo
Attorney, Agent, or Firm—Lawrence R. Fraley

[57] ABSTRACT

A fiber optic connector assembly wherein two individual fiber optic connectors are retained in a side-by-side arrangement which enables relative freedom of movement therebetween so as to facilitate positioning of the retained two (also called a duplex) within a common housing. Such movement accommodates for manufacturing tolerances within the housing and/or connectors, while still assuring successful insertion within the common housing. An adapter, having two clamping portions (one for each connector) interconnected by a resilient portion, assures this movement.

23 Claims, 3 Drawing Sheets

FIBER OPTIC CONNECTOR ASSEMBLY AND ADAPTER FOR USE THEREWITH

TECHNICAL FIELD

This invention relates to fiber optic connector assemblies and particularly to those designed for providing positive connection, optically, between singular fiber optic connectors.

BACKGROUND

Producers and those who utilize voice and/or data communications systems have become very interested in optical fibers as a transmission medium. The advantages of fibers over other kinds of transmission media are well known. The potential bandwidth (or message carrying capacity) of optical fibers is extremely high. Systems using optical cables are resistant to electromagnetic interference which sometimes plagues systems having electrical cables. Moreover, optical cable systems are considered somewhat more secure than electrical cable systems since it is more difficult for unauthorized personnel to tap or access a fiber optic cable without being detected.

Fiber optic devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together as a cable. Additionally, several transmission lines can be arranged in parallel for the simultaneous transmission of information along each of the separate lines.

Where the transmission line is relatively long and extends between different pieces of apparatus, the transmission line is divided into segments and the different segments are connected to each other using separable fiber optic connectors which have been developed to meet this need. The principal design criteria of such connectors is to connect the transmission lines in an end-to-end relationship in such a manner as to minimize the loss of light energy as light traverses from one end of one line into the end of the adjacent segment of that line. The most efficient transfer of energy occurs when the axis of the two lines are in precise alignment. In other words, if the ends of the lines are out of alignment either due to lateral or slight angular displacement, light energy will be lost. Thus, most fiber optic connectors are designed to bring the ends of the transmission lines into as perfect an axial alignment as possible.

When a transmission line is made up of a plurality of individual fibers joined together to form a bundle or cable for the transmission of a single piece of information along the line, it is not critical or necessary that the individual fibers be aligned exactly with the ends of the fibers on the other cable since most of the light emitting from one end will be accepted into the fibers on the other side. However, where a transmission line is made up of a single individual fiber, it is more critical that the end of one be perfectly aligned with the end of the other to minimize energy loss.

There presently exist various connector assemblies in the art which are capable of attaining such precisioned, end-to-end alignment, once the selected individual fiber optic connectors (each having at least one optical fiber therein) are positioned within a designated common housing (or housings) of the assembly. Due to manufacturing tolerances, however, proper alignment between these individual connectors and common housing (also referred to in the art as an adapter) is often difficult, particularly when attempting to align and position paired arrangements of such individual connectors. To accomplish this, such individual fiber optic connectors have been encased within a singular housing, being referred to in the art as a duplex connector, and then inserted within the corresponding, common housing. Separation of these individual connectors (typically two) in such a substantially fixed arrangement is, obviously, very difficult. Because of this relatively rigid form of encasement, flexibility of movement between the ends of these individual connectors is substantially prohibited, thus complicating final alignment and positioning of the connectors within the designated common housing.

As will be defined herein, the instant invention provides what can also be referred to as a duplex connector, but one wherein originally separate, individual fiber optic connectors are retained in not only a side-by-side orientation capable of being inserted within a corresponding common housing (to form a connector assembly) but also an orientation which permits relative freedom of movement between said individual connectors so as to accommodate for manufacturing tolerances in the common housing and/or housings of the individual connectors, thereby facilitating such alignment.

It is believed that such an invention would constitute a significant advancement in the art.

DISCLOSURE OF THE INVENTION

It is, therefore, a primary object of the invention to provide a fiber optic connector assembly wherein individual fiber optic connectors are permitted relative freedom of movement therebetween to thereby enable these retained connectors to be inserted within a common housing (adapter) in a facile manner.

It is another object of the invention to provide such an assembly which is of relatively simple construction and which can be produced in a relatively inexpensive manner.

In accordance with one aspect of the invention, there is provided an adapter for holding two individual fiber optic connectors of the push-pull variety in a predetermined manner of alignment prior to positioning the connectors within a corresponding connector housing. The adapter comprises first and second clamp members, each of the clamp members adapted for clamping onto a respective one of the fiber optic connectors, and resilient means interconnecting the first and second clamp members and oriented substantially therebetween for enabling the clamp members to move in at least four different orientations relative to each other to enable movable alignment therebetween prior to the positioning of the connectors within the connector housing. Positioning of the clamped individual connectors within the common housing is thus facilitated.

In accordance with another aspect of the invention, there is provided a fiber optic connector assembly including a connector housing defining a pair of chambers therein, at least two individual fiber optic connectors of the push-pull variety each positioned within a respective one of the chambers of the connector housing, and an adapter for holding the fiber optic connectors in a predetermined manner of alignment prior to the positioning thereof within the connector housing. The adapter includes first and second clamp members, each of the clamp members adapted for clamping onto a respective one of the fiber optic connectors, and resilient means interconnecting the first and second clamp members and oriented substantially therebetween for enabling the clamp members to move in at least four different orientations relative to each other to provide adjustable alignment therebetween prior to the positioning of the connectors within the connector housing, thereby facilitating such positioning.

BRIEF DESCRIPTION OF THE DRAWINGS

FIG. 5 is on a slightly enlarged scale over FIG. 4, for illustration purposes.

BEST MODE FOR CARRYING OUT THE INVENTION

For a better understanding of the present invention, together with other and further objects, advantages and capabilities thereof, reference is directed to the following disclosure and appended claims, in connection with the above-described drawings.

Figure 1:
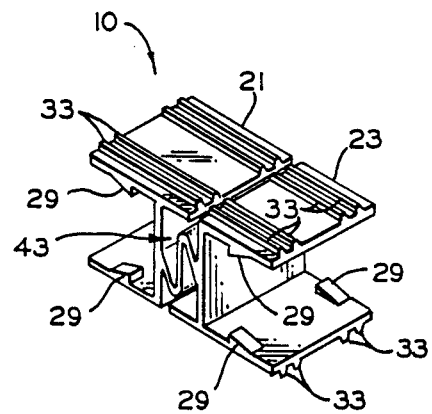
FIG. 1 is a perspective view of an adapter for holding two individual fiber optic connectors in the unique movable orientation defined herein, in accordance with a preferred embodiment of the invention.
Figure 2:
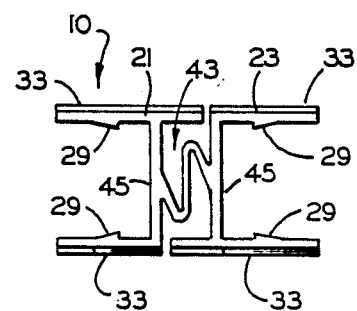
FIG. 2 is a front elevational view of the adapter of FIG. 1.

In FIGS. 1 and 2, there is shown an adapter 10 in accordance with a preferred embodiment to the invention. Adapter 10 is specifically designed for holding two individual fiber optic connectors 13 and 15 (FIG. 3) of the push-pull variety in a predetermined manner of alignment so as to facilitate positioning of these connectors within a corresponding common connector housing (e.g., housing 17 in FIG. 4). Connectors 13 and 15 are not shown in FIGS. 1 and 2. By the term push-pull as used herein is meant to define any form of fiber optic connector which is inserted within a corresponding housing or the like so as to be in alignment therein with another optical device (e.g., another connector). As described herein, each connector includes therein at least one optical fiber and is thus adapted for being aligned with another, substantially similar connector also including therein a corresponding optical fiber. The function of the assembly shown in FIGS. 4 and 5 (as assembled) is thus to precisely align respective, opposed fiber optic connectors so that the individual optic fibers therein are precisely aligned. As stated, the function of adapter 10 is to positively retain a singular pair of these individual connectors in side-by-side orientation such that these two, now forming what may also be referred to as a duplex arrangement, may be simultaneously inserted within a common connector housing such as housing 17. The invention as defined herein uniquely enables these individual connectors 13 and 15, while being positioned in this side-by-side relationship, to be moved relative to each other in at least four different forms of movement (to be explained below). Such movement facilitates positioning of each duplex arrangement, thereby readily compensating for manufacturing tolerances within the outer housings of each singular connector and/or the common connector housing into which these will be positioned.

Figure 3:
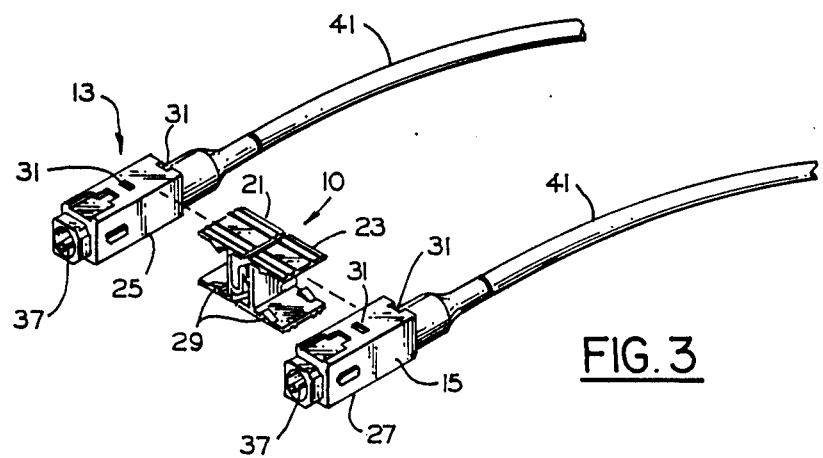
FIG. 3 is a perspective view, on a reduced scale over that of FIG. 1, showing the adapter of FIG. 1 and the positioning relationship thereof with regard to two individual fiber optic connectors to which it can be joined to form a duplex arrangement adaptable for facile insertion into a common connector assembly housing (FIG. 4)

In FIGS. 1 and 2, adapter 10 is shown to include first and second clamp numbers 21 and 23, respectively, each of a substantially C-shape configuration, and designed for clamping onto and firmly retaining a respective one of the connectors 13 and 15. As specifically shown in FIG. 3, first clamp member 21 is particularly adapted for clamping onto the outer surface of the insulative (e.g. plastic) housing 25 of connector 13 while second clamp member 23 is adapted for similarly clamping onto the outer surface of the plastic housing 27 for connector 15. Such firm clamping and retention is further assured by the provision of a plurality of upstanding, projecting tabs 29 on opposing internal surfaces of each C-shaped member for aligning with and being positioned within corresponding openings (or slots) 31 formed within the external surface of each connector's plastic housing. Although only two such openings 31 are depicted in FIG. 3 for each connector, it is understood that a total of four are provided, two each on opposing sides thereof, to accommodate the respective four tabs 29 of each clamp member. It is also understood that the invention is not limited to the means of retention (projecting tabs with associated openings) shown herein. In the case of such projecting tabs, it is even further understood that the invention is not limited to the numbers of such elements as shown herein. Other combinations are readily possible.

For reinforcement purposes, each clamp member also includes a plurality of ribs 33 within the outer top and bottom surfaces thereof. As shown in FIG. 1 a total of four such reinforcing ribs 33 are provided in each of these two surfaces.

Although each clamp member 21 and 23 as shown herein is shown as being of C-shape configuration, this is not meant to limit the invention in that other configurations are possible. In the embodiments as depicted herein, however, such a configuration is preferred to better accommodate the respectively similar configuration for the housings of each fiber optic connector being retained by the invention. As to singular fiber optic connectors such as connectors 13 and 15, these typically include the described outer plastic casing (25 or 27) which serves to contain the optical fiber 35 (FIG. 5) therein. Projecting from the end of each casing is the cable 41 also including the remainder of the optical fiber and having the designed cladding and other protective elements is part thereof. By way of example, one known optical fiber connector capable of being successfully retained by the adapter of the invention along with another, similar such connector, is available from the NTT (Nippon Telegraph and Telephone) International Corporation, Tokyo, Japan, and referred to as an SC-01 straight plug connector. These connectors each include a rectangular (in cross section) casing, as shown, and use a high precision ceramic ferrule (see below). Very low return loss is possible when using such connectors. The casings used in these connectors typically have a length of only about one inch and cross-sectional dimensions of only about 0.35 inch by about 0.29 inch. Such a connector is also capable of housing either single mode or multimode fibers. A plastic material used for the outer casing of each connector is polybutylene terephthalate, having a twenty percent glass fiber reinforcement. As stated, each connector 13 and 15 also includes a ferrule 37 (see also FIG. 5) positioned therein and designed for accommodating the respective end of the optical fiber 35. Use of such a ferrule assures positive retention of the optical fiber's terminal end and subsequent alignment thereof with a second optical fiber (e.g., located within a corresponding ferrule) or other such optical component. Each such connector also includes the aforementioned extending cable portion 41. It is understood that the invention is not limited to positive retention of the aforementioned fiber optic connector but that other connectors, including those having different external configurations, (e.g., hexagonal, round, etc) may also be effectively retained, aligned and positioned using the teachings herein.

Figure 7A:
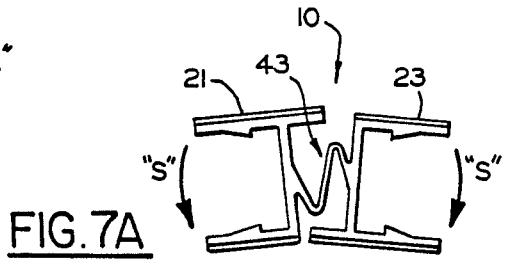
Figure 7B:
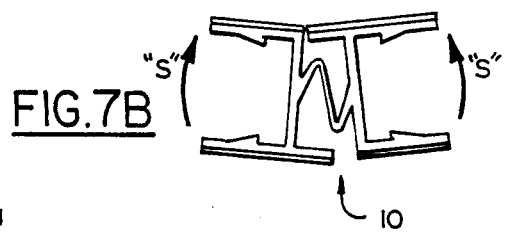
Figure 8A:
Figure 8B:
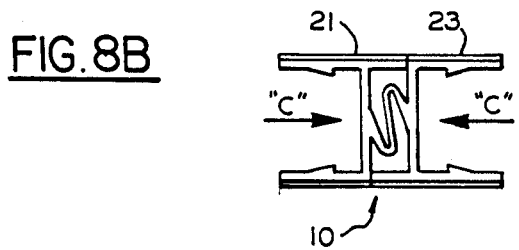

As shown in FIGS. 1 and 2, interconnecting the first and second clamp members 21 and 23 is a resilient means 43 which, due to its unique web-like configuration, enables the respective clamp members to move in at least four different orientations relative to each other such that the retained individual fiber optic connectors 13 and 15 are similarly moved to thus facilitate positioning of these connectors within the assembly's common housing (e.g. 17). Resilient means 43 is, as shown, of substantially S-shaped configuration and joined at the approximate mid-point of the opposing vertical walls 45 of each clamp. As particularly shown in FIG. 2, this interim, S-shaped web-like resilient portion for adapter 10 is of substantially less thickness than that of the corresponding clamp portions of the adapter. As also shown in FIG. 2, the clamp members and resilient means are formed of a singular material and of integral construction. This is not meant to limit the invention, however, in that other constructions (e.g., wherein the resilient means is attached to each clamp member) are possible. The integral construction as defined herein is preferred, however, and may be produced by known manufacturing techniques such as injection molding. Adapter 10 is preferably of plastic material and more preferably nylon. Other plastic materials are of course acceptable, including polycarbonates. In one example of the invention, an adapter having C-shaped clamp members of a thickness within the range of about 0.027 inch to about 0.033 inch was produced and successfully utilized, said adapter having an interim resilient portion possessing a thickness within the range of only about 0.017 inch to about 0.023 inch. Thus, the overall average thickness for the clamp members of the invention may be within the range of only about 1.2 to 2.0 times as thick as the thinner, web-like interim resilient portion. It is also understood in the embodiment depicted in FIGS. 1 and 2 that the resilient interconnecting portion extends substantially the entire width (i.e., "W" in FIG. 5) of each clamp member. See also FIGS. 9A and 9B. It is also shown in FIGS. 1 and 2 that the opposing flange portions of each clamp member are of different lengths to mate with corresponding similarly dimensioned flange portions for the adjacent clamp member. This dimensioned arrangement is preferred in order to prevent over stressing on resilient means 43 during various forms of movement by the invention's clamp members 21 and 23 (e.g., as shown in FIGS. 7A, 7B and 8B).

Figure 4:
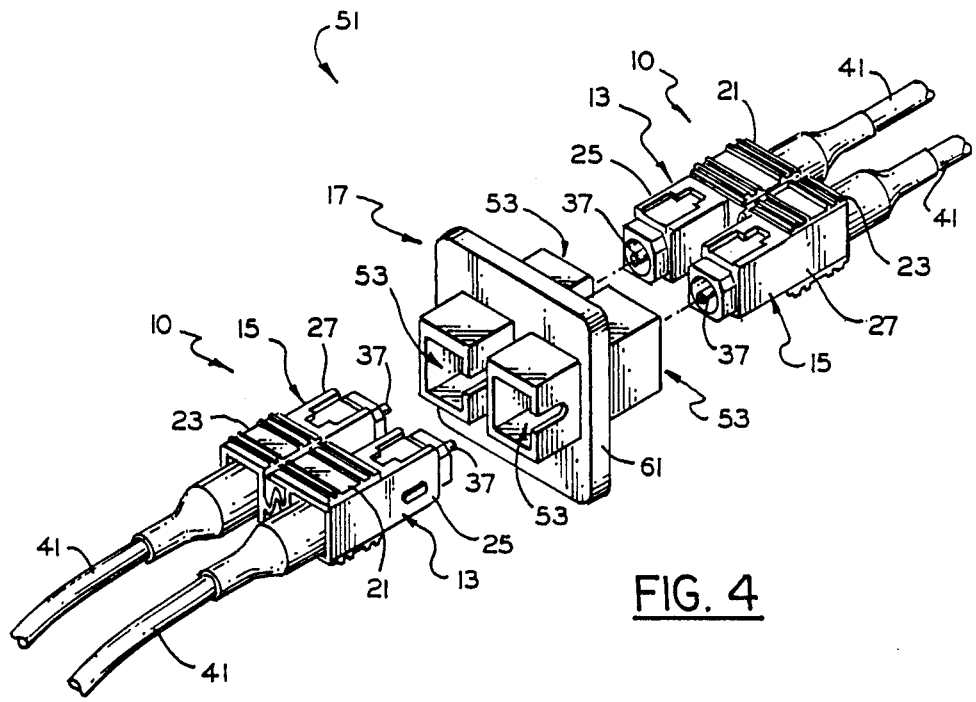
FIG. 4 is a perspective view showing a pair of opposed duplex fiber optic connector arrangements capable of being inserted within a common assembly housing from opposite sides thereof, each of these pairs being held together using the adapter of FIG. 1.
Figure 5:
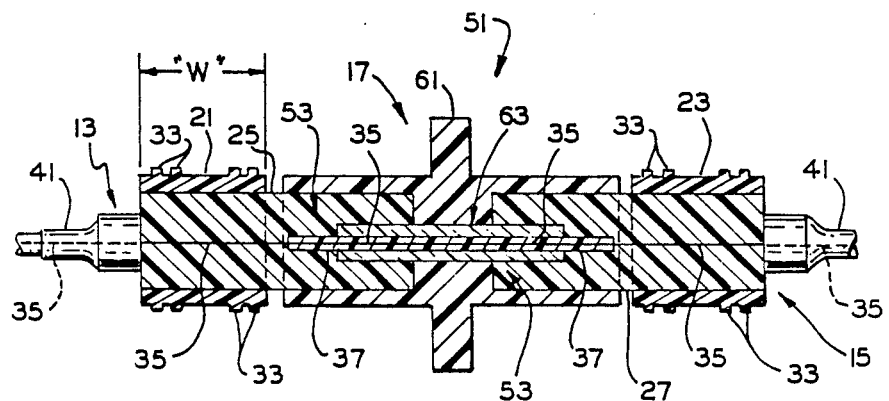
FIG. 5 is a side elevational view, in section, illustrating the fiber optic connector assembly in accordance with a preferred embodiment of the invention, the assembly including the two pairs of duplex connectors shown in FIG. 4 positioned within the common housing also shown in FIG. 4 from opposite sides thereof.

As illustrated in FIGS. 4 and 5, there is shown a fiber optic connector assembly 51 in accordance with a preferred embodiment of the invention. Assembly 51 includes the afore mentioned common housing 17 which defines therein a pair of chambers 53, each designed for accommodating a respective one of the fiber optic connectors 13 or 15. As better shown in FIG. 4, common housing 17 defines a pair of substantially adjacent such chambers 53 on each opposite side of a common flange or interim member 61. Also located within this flange 61 is an alignment sleeve 63 designed for having the aforementioned ferrules 37 inserted within opposite ends thereof when each connector in turn is inserted within a respective chamber to thereby form the completed assembly herein. Housing 61 is preferably of plastic material, (e.g., polycarbonate), and alignment sleeve 63 is preferably ceramic (e.g., zirconia). It is to be understood that the illustrated configuration for the common housing 17, like that for the individual fiber optic connectors 13 and 15, is not meant to limit the invention. That is, other configurations are readily usable according to the teachings of this invention. For example, although separate chambered portions are shown as projecting from opposite sides of the common housing 17 in a paired, spaced relationship, it is also within the scope of the invention to provide other external configurations and still achieve the desired side-by-side orientation depicted herein. Thus, the configurations depicted herein are for representative purposes only.

With the opposing paired connectors fully inserted within common housing 61, the defined optical fiber containing ferrules are mated in an abutting relationship as shown in FIG. 5 to thus provide the precise alignment necessary. Prior to this positioning, however, it is necessary to properly align the individual fiber optic connectors 13 and 15 with respect to the corresponding chambers 53 into which these components will be inserted. Due to manufacturing tolerances within typical common housings of the type shown and described herein, as well as within the respective casings and other components which form each fiber optic connector, such alignment and initial positioning has proven relatively difficult to attain. As stated, the instant invention facilitates this alignment and positioning by enabling the paired fiber optic connectors to move independently in at least four different forms of movement so as to possess relative freedom of movement therebetween immediately prior to insertion within the assembly's common housing.

Figure 6A:
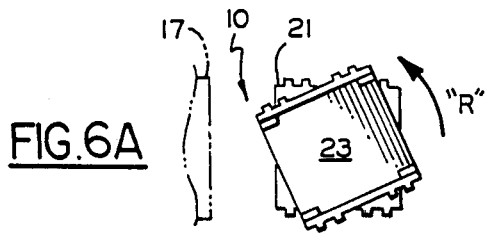
FIGS. 6A, 6B, 7A, 7B, 8A, 8B, 9A and 9B illustrate the four different forms of relative movement between the individual fiber optic connectors retained within each duplex arrangement formed using the adapter of the invention to thereby facilitate positioning of these connectors within a common housing such as depicted in FIGS. 4 and 5.
Figure 6B:
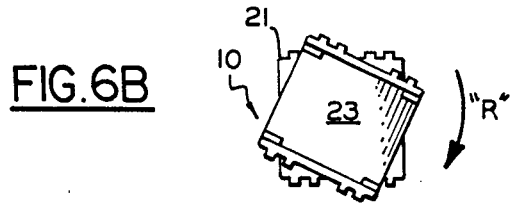

In FIGS. 6A and 6B, there is illustrated one of the four different forms of movement possible between adjacent clamp members which form one of the adapters 10 of the invention. This movement as shown in FIGS. 6A and 6B can best be described as rotational wherein each of the clamp members 21 and 23 is capable of rotating relative to the other (represented by the arrows "R"). It is understood that the clamped, fiber optic connector housings (not shown) are similarly moved relative to each other when viewed from the side orientation in these drawing FIGURES. In contrast, in FIGS. 7A and 7B, each of the separate clamp members (and thus the individual connectors) is moved upwardly and downwardly relative to the other. Alternatively, both may be moved substantially simultaneously (represented by the arrows "S") in an upward or downward manner. This latter movement occurs in a plane substantially perpendicular to that of the aforementioned rotational movement shown in FIGS. 6A and 6B. Thus, each individual fiber optic connector as firmly clamped by the respective clamp members 21 and 23 may be simultaneously moved downwardly or upwardly by the person attempting to insert these connectors within the common housing. Alternatively, it is possible to move only one of these connectors while maintaining the other in a fixed orientation or to move both in a opposite (one up, the other down) manner In FIGS. 8A and 8B, a third form of movement is shown, this movement occurring along a plane substantially similar to that of the movement in FIGS. 7A and 7B. This movement can be described as either expansive in nature ("E" in FIG. 8A) or compressive ("C" in FIG. 8B), wherein the separate clamp members are moved outwardly away from each other or inwardly toward each other, respectively. The extent of inward (compressive) movement is limited by the end portions of each flange, which in turn may be modified (e.g., reduced) to adjust for more or less compression if desired.

Figure 9A:
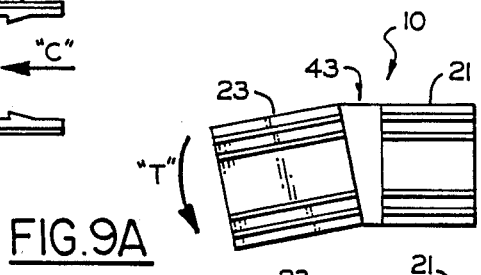
Figure 9B:
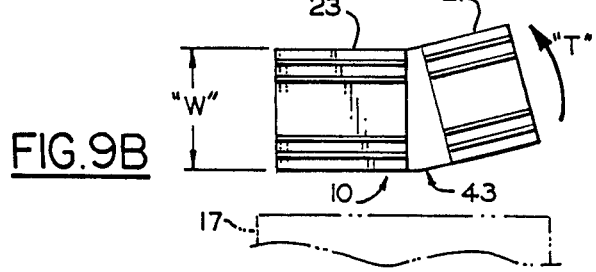

In FIGS. 9A and 9B, there is shown yet a fourth mode of movement capable of being provided by the unique adapter of the instant invention. In this orientation, the respective clamp members may be moved in a substantially twisting type motion ("T") relative to each other to thereby allow similar movement of the individual fiber optic connectors contained therein. In FIG. 9A, for example, the optic connector (not shown) retained by clamp member 21 is retained in a substantially perpendicular orientation to the corresponding housing 17 while the adjacent clamp member 23 may be twisted in a slightly angular offset therefrom. It is understood that this direction of movement by the respective clamp members in FIG. 9B (substantially opposite to that of FIG. 9A) occurs in a plane substantially perpendicular to that occupied by the common housing 17. Conversely, the movement of the clamp members in FIGS. 7A, 7B, 8A and 8B occurs in a plane substantially parallel to the housing 17. It is further understood that the rotational movement described in FIGS. 6A and 6B also occurs in a plane substantially perpendicular to the common housing. This plane for the common housing 17 is represented in phantom in FIGS. 6A and 9B.

It is understood from the foregoing that it is also readily possible to provide a combination of the various movements defined herein. For example, the adapter of the invention enables both rotational movement (e.g., FIG. 6A) and expansive movement (e.g., FIG. 8A) to occur simultaneously. Thus, a multitude of combinations of movements are possible using the unique teachings of the invention.

There has thus been shown and described a fiber optic connector assembly wherein an adapter is utilized to hold two individual fiber optic connectors in a substantially side-by-side relationship while still enabling these connectors to exhibit relative freedom of movement therebetween such that this combined assembly can be more readily positioned within a common housing connector assembly housing or the like. The invention as defined herein is of relatively simple construction and can be readily adapted to many existing fiber optic connector designs. It may also be produced in a relatively inexpensive manner, and is readily adaptable to mass production.

While there have been shown and described what are at present considered the preferred embodiments of the invention, it will be obvious to those skilled in the art that various changes and modifications may be made therein without departing from the scope of the invention as defined by the appended claims.

What is claimed is:

1. An adapter for holding two individual fiber optic connectors of the push-pull variety in a predetermined manner of alignment prior to positioning said connectors within a corresponding connector housing, said adapter comprising:

first and second clamp members, each of said clamp members adapted for clamping onto a respective one of said fiber optic connectors to hold said fiber optic connectors in a substantially side-by-side relationship; and resilient means interconnecting said first and second clamp members and oriented substantially therebetween for enabling said clamp members to move in at least four different orientations relative to each other while holding said connectors in said substantially side-by-side relationship to enable movable alignment between said clamp members prior to said positioning of said connectors within said connector housing, thereby facilitating said positioning.

2. The adapter according to claim 1 wherein each of said clamp members is of a substantially C-shaped configuration.

3. The adapter according to claim 2 wherein each of said clamp members is adapted for clamping onto the outer surface of said respective one of said fiber optic connectors.

4. The adapter according to claim 1 wherein said clamp members and said interconnecting resilient means are of integral construction.

5. The adapter according to claim 4 wherein said adapter is comprised of plastic material 6. The adapter according to claim 5 wherein said plastic material is nylon.

7. The adapter according to claim 1 wherein said resilient means interconnecting said first and second clamp members is of substantially S-shaped configuration.

8. The adapter according to claim 7 wherein said resilient means is of a thickness less than that of each of said clamp members.

9. The adapter according to claim 8 wherein said adapter is comprised of plastic material.

10. The adapter according to claim 9 wherein said plastic material is nylon.

11. A fiber optic connector assembly comprising:

a connector housing defining a pair of chambers therein;

at least two, individual fiber optic connectors of the push-pull variety, each being positioned within a respective one of said chambers of said connector housing; and an adapter for holding said fiber optic connectors in a predetermined manner of alignment prior to said positioning thereof within said connector housing, said adapter including first and second clamp members, each of said clamp members adapted for clamping onto a respective one of said fiber optic connectors to hold said fiber optic connectors in a substantially side-be-side relationship, and resilient means interconnecting said first and second clamp members and oriented substantially therebetween for enabling said clamp members to move in at least four different orientations relative to each other while holding said connectors in said substantially side-by side relationship to provide adjustable alignment between said clamp members prior to said positioning of said connectors within said connector housing, thereby facilitating said alignment.

12. The assembly according to claim 11 wherein the number of fiber optic connectors is four and the number of adapters is two, each of said adapters holding a respective pair of two of said fiber optic connectors, said connectors being positioned within said chambers of said connector housing in an opposing manner.

13. The assembly according to claim 12 wherein each of said fiber optic connectors includes a ferrule therein having an optical fiber therein.

14. The assembly according to claim 13 wherein said connector housing further includes an alignment sleeve therein, each of said ferrules adapted for being inserted within said alignment sleeve when said fiber optic connector is positioned within said connector housing.

15. The assembly according to claim 11 wherein each of said clamp members is of substantially C-shaped configuration.

16. The assembly according to claim 15 wherein each of said clamp members is adapted for clamping onto the outer surface of said respective one of said fiber optic connectors.

17. The assembly according to claim 11 wherein said clamp members and said interconnecting resilient means are of integral construction.

18. The assembly according to claim 17 wherein said adapter and said connector housing are each comprised of a plastic material.

19. The assembly according to claim 18 wherein said plastic material is nylon.

20. The assembly according to claim 11 wherein said resilient means interconnecting said first and second clamping members is of a substantially S-shaped configuration.

21. The assembly according to claim 20 wherein said resilient means is of a thickness less than that of each of said clamp members.

22. The assembly according to claim 21 wherein said adapter is comprised of a plastic material.

23. The assembly according to claim 22 wherein said plastic material is nylon.

* * * * *

UNITED STATES PATENT AND TRADEMARK OFFICE
CERTIFICATE OF CORRECTION

PATENT NO. : 4,953,929  
APPLICATION NO. : 07/382925  
DATED : September 4, 1990  
INVENTOR(S) : Joseph F. Basista, Wai M. Ma and John J. Squires It is certified that error appears in the above-identified patent and that said Letters Patent is hereby corrected as shown below:

Column 1, line 3  
This invention was made with Government support under Subcontract no. B338307 awarded by Department of Energy. The Government has certain rights in this invention.

Signed and Sealed this

Fifteenth Day of January, 2008

JON W. DUDAS  
*Director of the United States Patent and Trademark Office*